United States Patent [19]

Oku et al.

[11] Patent Number: 5,173,783
[45] Date of Patent: Dec. 22, 1992

[54] METHOD OF RECORDING IMAGES ON PHOTOSENSITIVE MATERIAL IN A PROCESS SCANNER DEVICE USING SETUP DATA STORED IN A PORTABLE MEMORY AFTER GENERATING THE SETUP DATA BY STATISTICAL ANALYSIS OF IMAGE SIGNALS IN A SEPARATE SETUP SCANNER DEVICE

[75] Inventors: Yoshiki Oku; Naohiko Kawashima; Masayoshi Matsuba, all of Kyoto, Japan

[73] Assignee: Dainippon Screen Mfg. Co., Ltd., Japan

[21] Appl. No.: 793,994

[22] Filed: Nov. 18, 1991

[30] Foreign Application Priority Data

Nov. 27, 1990 [JP]  Japan .................. 2-327160

[51] Int. Cl.$^5$ .................. H04N 1/06; H04N 1/20; H04N 1/23; H04N 1/40; H04N 1/46
[52] U.S. Cl. .................. 358/302; 358/76; 358/80; 358/406; 358/444; 358/298; 358/456
[58] Field of Search .............. 358/302, 296, 298, 76, 358/406, 80, 75, 444, 456

[56] References Cited

U.S. PATENT DOCUMENTS 4,583,186  4/1986  Davis .................. 358/76
4,707,119  11/1987  Terashita .................. 358/76

Primary Examiner—Benjamin R. Fuller
Assistant Examiner—Scott A. Rogers
Attorney, Agent, or Firm—Ostrolenk, Faber, Gerb & Soffen

[57] ABSTRACT

A setup device for automatically generating setup condition data for a process scanner is provided with an image reader and an image analyzing processor. An arbitrary number of originals are arranged on an original drum, which is mounted on the setup device. Respective images of the originals are read with an image reader of the setup device, and are statistically analyzed. A setup condition for each original is automatically determined and setup condition data representing the same is obtained. The setup condition data is stored in a floppy disk, which is transported to the process scanner. The process scanner reads the setup condition data from the floppy disk and establishes the setup condition in an image signal converter. The original drum is also transported to the process scanner, in which reproduction of the images of the originals is conducted without an operator.

29 Claims, 11 Drawing Sheets

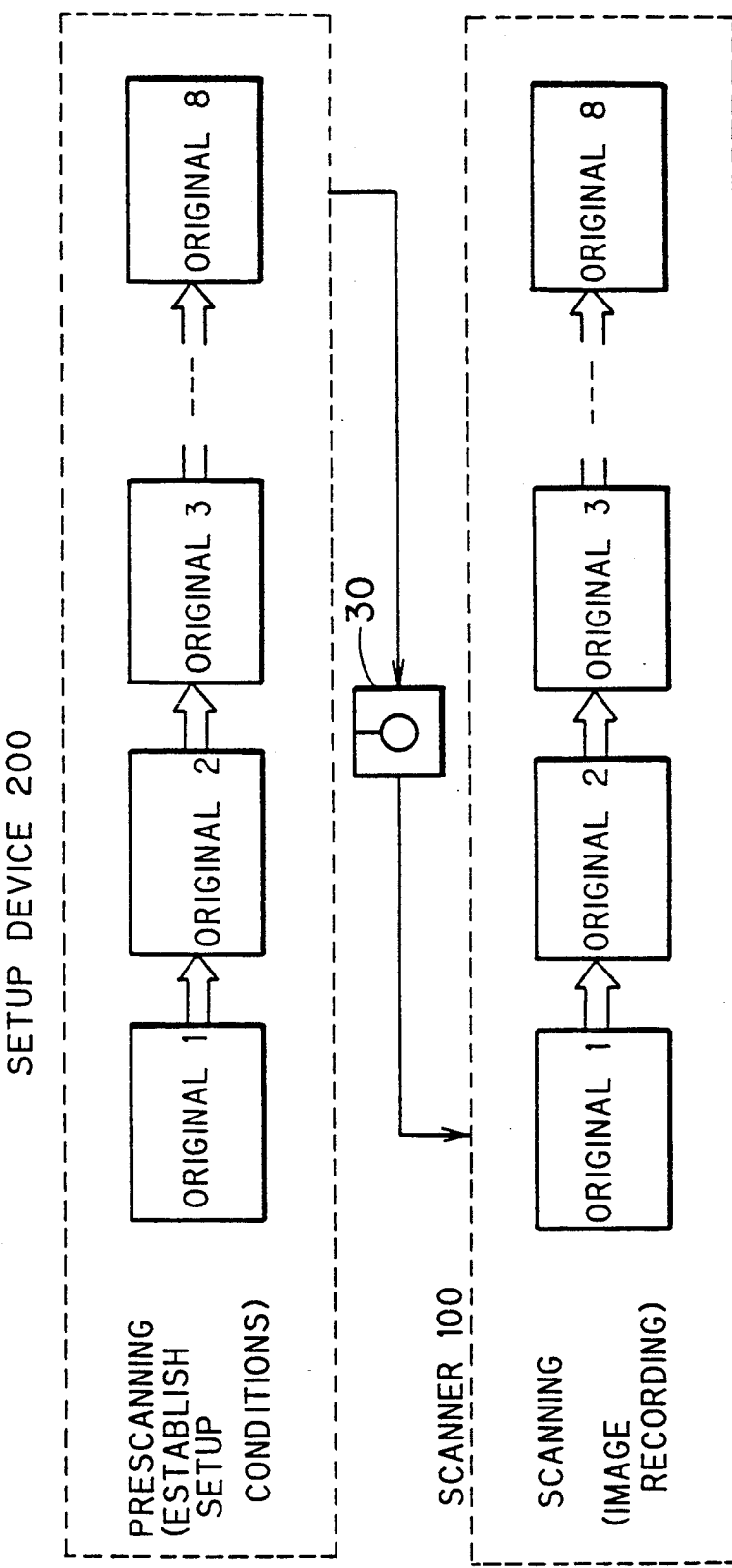

METHOD OF RECORDING IMAGES ON PHOTOSENSITIVE MATERIAL IN A PROCESS SCANNER DEVICE USING SETUP DATA STORED IN A PORTABLE MEMORY AFTER GENERATING THE SETUP DATA BY STATISTICAL ANALYSIS OF IMAGE SIGNALS IN A SEPARATE SETUP SCANNER DEVICE

BACKGROUND OF THE INVENTION

1. Field of the Invention

The present invention relates to a method of recording an image on a photosensitive material and an image recorder system therefor, and particularly to improvement in automatic setup of a process scanner which enables long time unmanned operation of the process scanner.

2. Description of the Prior Art

As well known in the field of process scanners, setup must be performed prior to color separation of an original image depending on characteristics of the original image and a type of printing. In conventional setup, an operator manually operates color separation condition keys while observing a color-separated image on a CRT monitor of a color previewer which is connected to a process scanner.

Such manual setup requires an experienced operator. In addition, since it takes a quite long time to establish setup conditions, the process scanner cannot be used for reading an original image while it is used for establishing the setup conditions. Thus, the operation efficiency of the process scanner is degraded.

To solve the problem that an experienced operator is needed, various techniques have been developed. The techniques are directed to automatization of basic operation in establishing setup conditions, where automatic setup is attained in the scanner itself. One such effort is disclosed by the inventor of the present invention in Japanese patent laying open gazette No. 63-42575 (1988). On the other hand, techniques developed to solve the problem regarding the operation efficiency include one disclosed by the inventor of the present invention in Japanese patent laying open gazette No. 62-231566 (1987). This technique suggests that an operator operates a setup device or a preparation device comprising an image-input scanner unit to establish setup conditions, the setup device being provided separately from the process scanner.

Automatic establishment of setup conditions by using the process scanner has a problem. Although an experienced operator is not needed, there is a limit in improving the operation efficiency of the process scanner. This is because the process scanner itself is occupied for establishing the setup conditions and is not always dedicated to image reading. On the other hand, if a setup device is used, an experienced operator who operates the setup device is required.

Thus, long time unmanned operation of a process scanner has been impossible in the conventional arts despite needs for the same.

SUMMARY OF THE INVENTION

The present invention is directed to a method of recording an image on an image recording medium.

According to the present invention, obtained are a setup device and an image scanner which are spatially separated from each other.

The setup device comprises a first image reader and an image analyzing means, while the image scanner comprises a second image reader, an image signal converter and an image recorder.

An original to be reproduced is prepared. The original is mounted on the first image reader of the setup device. An image of the original by the first image reader of the setup device is read to obtain a first image signal.

The first image signal is statistically analyzed by the image analyzing means to determine a setup condition under which the image of the original is to be recorded in the image scanner. Setup condition data representative of the setup condition is generated and is delivered to the image scanner to establish the setup condition in the image signal converter.

The original is detached from the first image reader of the setup device and then the original is mounted on the second image reader in the image scanner.

Then, the image of the original is read by the second image reader in the image scanner to obtain a second image signal representative of the image of the original. The second image signal is converted through the image signal converter holding the setup condition to obtain a converted second image signal. An image is recorded on an image recording medium by the image recorder in accordance with the converted second image signal.

In an aspect of the present invention, a plurality of originals are mounted on an original holding means such as an original drum. The original holding means holding the plurality of originals is mounted on the first image reader, and respective setup condition data for the plurality of originals are obtained in the setup device.

The setup condition data is stored in a portable data storage medium, which is transported to the image scanner. The original drum holding the plurality of originals is also transported to the scanner without detaching the plurality of originals. The respective images of the plurality of originals are serially read by the second image reader. An image signal representing each original image is converted according to the corresponding setup condition, to obtain a halftone image on a photosensitive material.

The present invention also provides a process scanner system.

According to the present invention, the system comprises a setup device and a process scanner provided at a position spatially separated from the setup device.

The setup device comprises: a first image reader operable to read respective image of at least one original to generate a first image signal; setup condition data generating means for statistically analyzing the first image signal to determine a setup condition for the respective image of the at least one original which is to be established in the process scanner and for generating setup condition data representative of the setup condition; and output means to output the setup condition data for the at least one original.

On the other hand, the process scanner comprises: a second image reader for accepting the at least one original which is transported from the setup device and for reading the respective image of the at least one original to generate a second image signal for respective image of the at least one original; input means for inputting the setup condition data which is output from the output means of the setup device; and image signal converter means in which the setup condition is established in accordance with the setup condition data input through the input means and for converting the second image signal to obtain a converted image signal for the at least one original according to the setup condition.

Also provided in the process scanner are: means for obtaining a halftone dot image signal from the converted image signal for the at least one original; and recording means for recording a halftone dot image on a photosensitive material for the at least one original in response to the halftone dot image signal.

The present invention further provides a setup device and a process scanner employable in the present scanner system.

The setup device according to the present invention has a function for automatically establishing the setup conditions while the process scanner has a function for receiving the setup condition data and automatically loading the setup conditions.

Hence, an experienced operator is not required in establishing setup conditions for respective original images. In addition, the operation efficiency of the process scanner is enhanced because the process scanner needs not to be used for operations other than image recording. The present invention is particularly advantageous when applied to where a plurality of original images are to be recorded since the process scanner provided with setup condition data for the original images can be operated without an operator for a long time.

As a result, setup conditions are correctly established, and therefore, the present system is appropriate for long time unmanned operation of the process scanner.

Accordingly, an object of the present invention is to provide a technique for making efficient use of a process scanner without an experienced operator.

Another object of the present invention is to achieve long time unmanned operation of the process scanner.

These and other objects, features, aspects and advantages of the present invention will become more apparent from the following detailed description of the present invention when taken in conjunction with the accompanying drawings.

BRIEF DESCRIPTION OF THE DRAWINGS

FIG. 11 is an explanatory diagram of a procedure flow according to the preferred embodiment.

DESCRIPTION OF THE PREFERRED EMBODIMENTS

A. Appearance and Overall Structure of System

Figure 1:
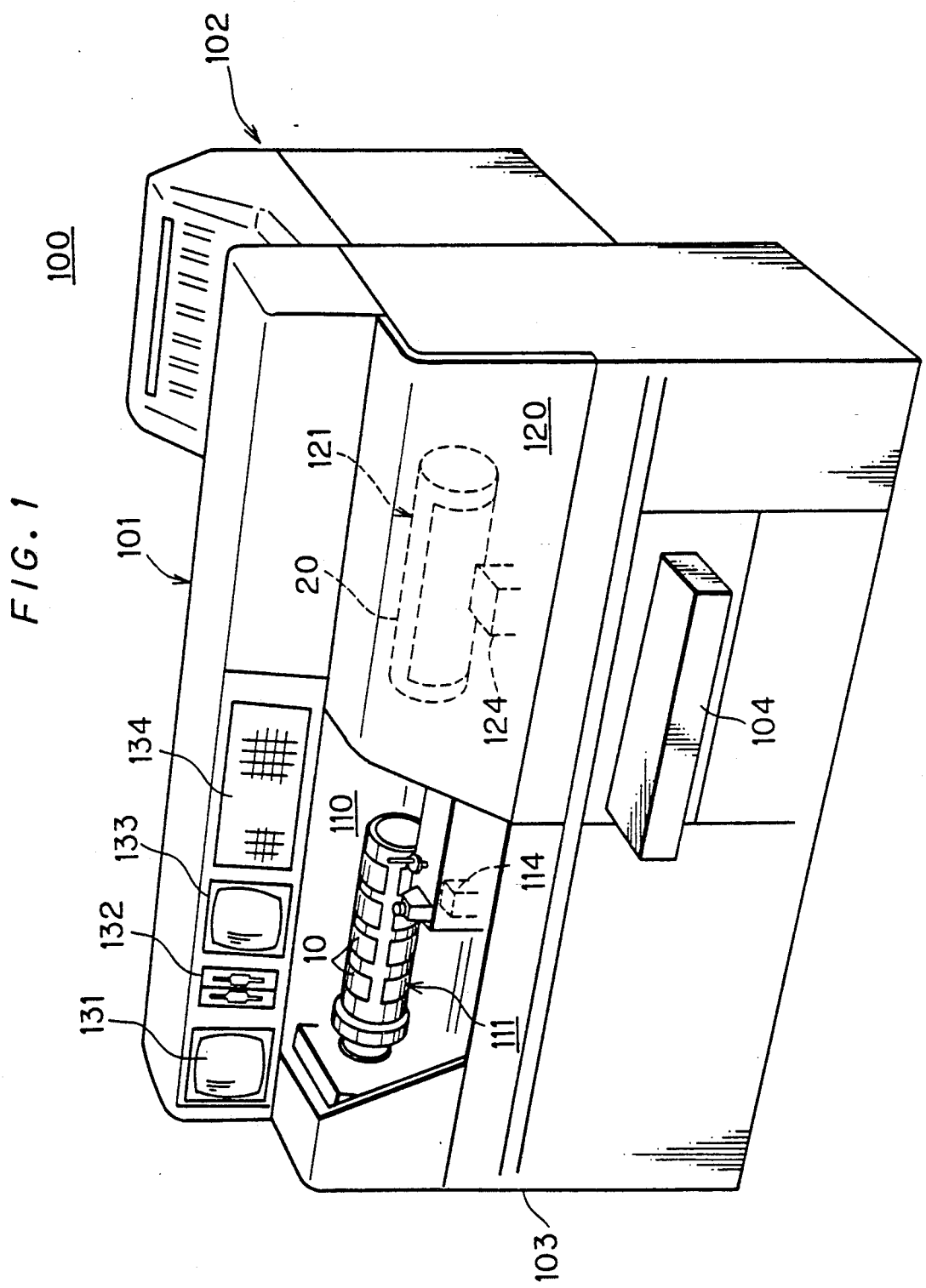
FIGS. 1 and 2 show a process scanner and a setup device of a process scanner system according to a preferred embodiment of the present invention, respectively.
Figure 2:
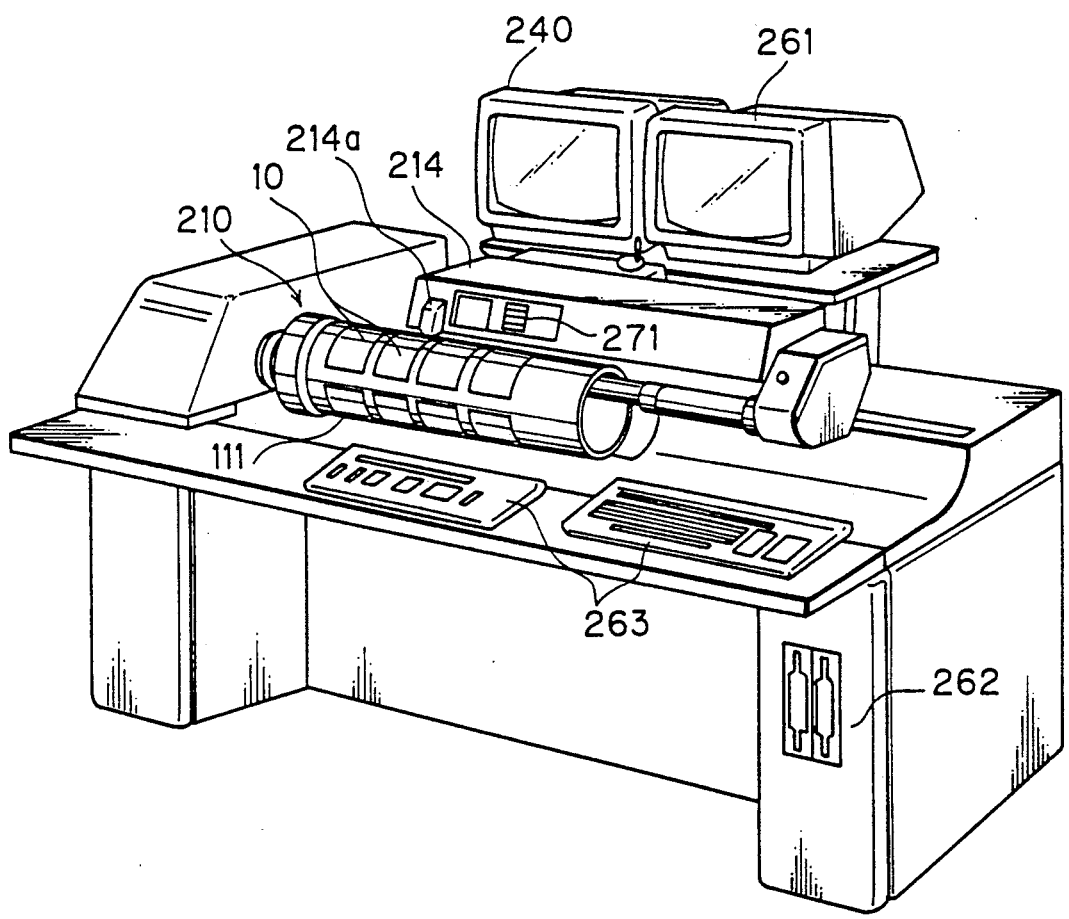

A process color scanner system according to a preferred embodiment of the present invention comprises a process color scanner 100 shown in FIG. 1 and a process setup device 200 shown in FIG. 2. Respective structures and operations of the scanner 100 and the setup device 200 are as follows:

(A-1) Process Color Scanner 100

Figure 3:
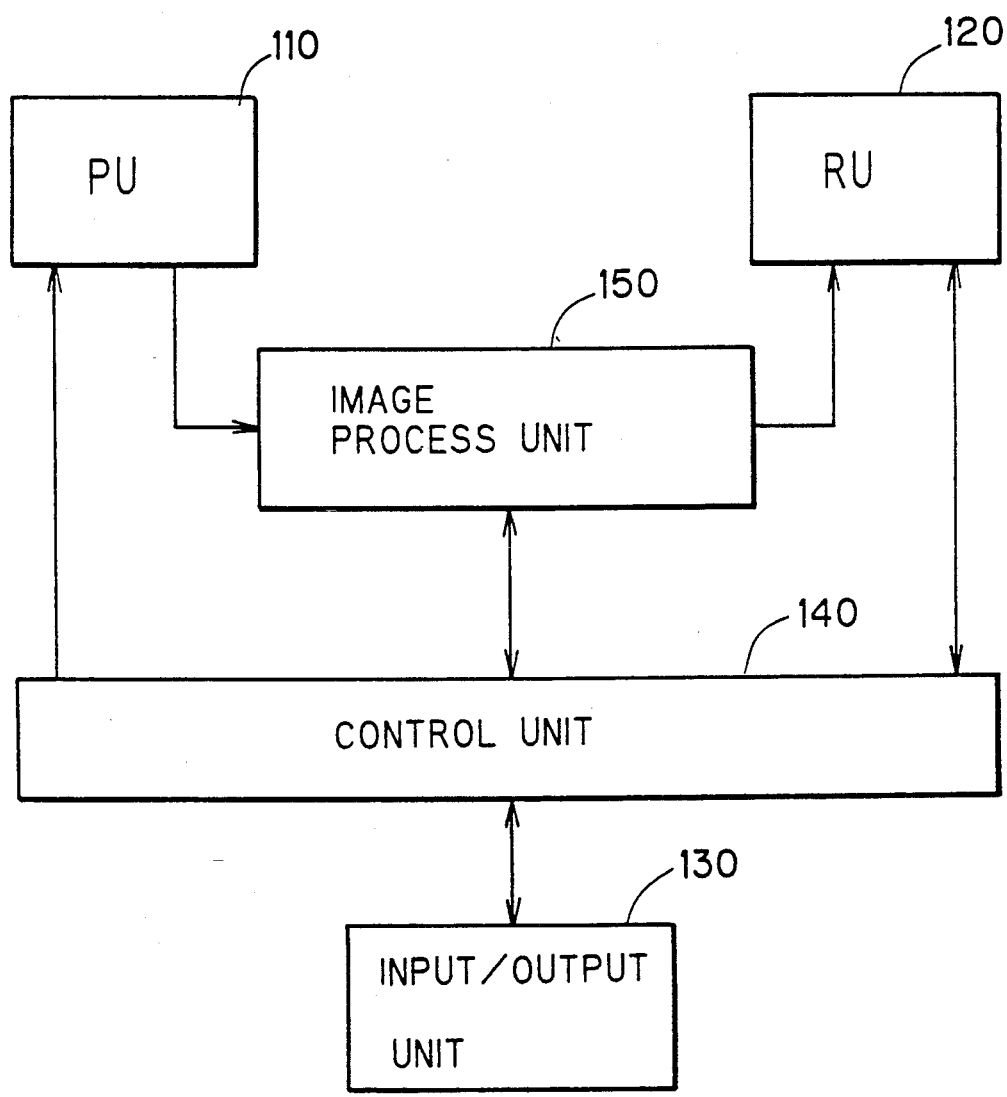
FIG. 3 is a schematic block diagram of the structure of a scanner unit.
Figure 4:
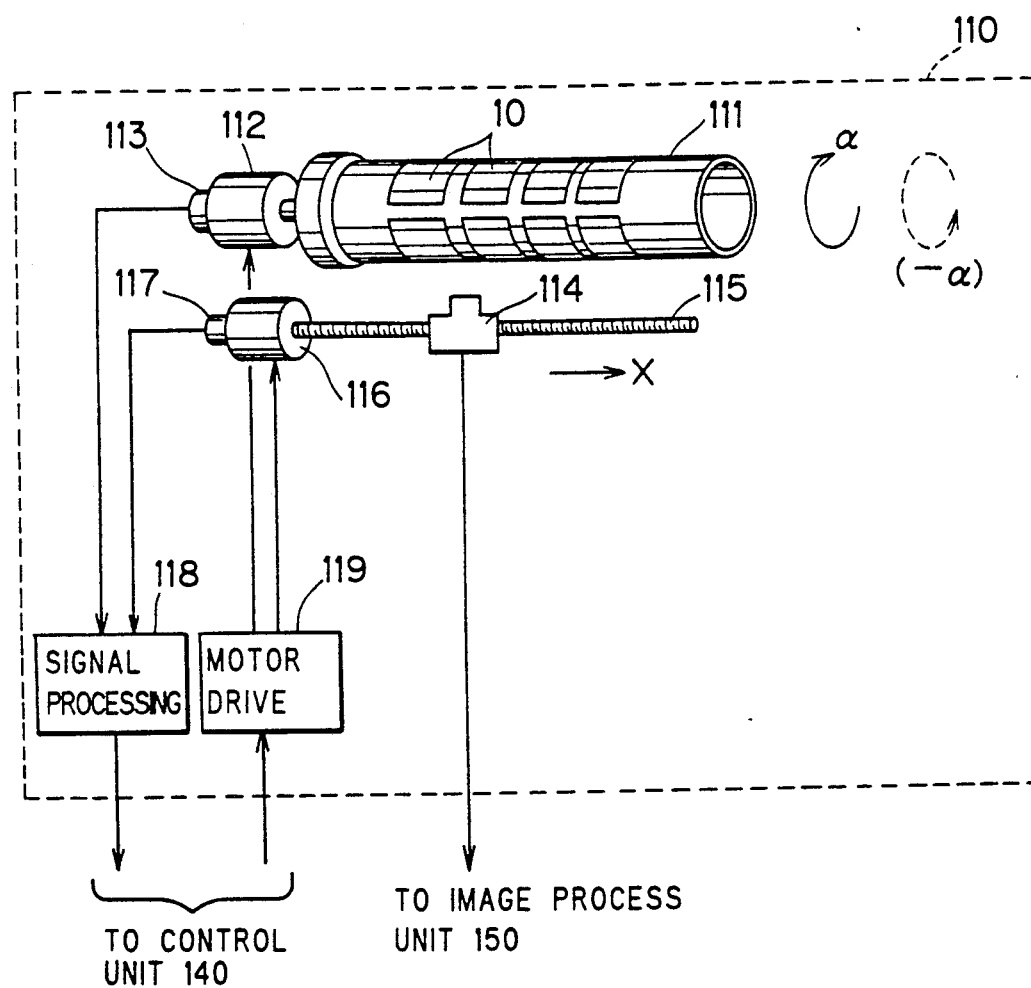
FIG. 4 is a diagram of the inner structure of a pickup unit of the scanner unit.

The process color scanner 100 includes a scanner unit 101 and an automatic processor 102 coupled to the unit 101. FIG. 3 is a schematic block diagram of the scanner unit 101. Detailed structures of the respective blocks of FIG. 3 are illustrated in FIGS. 4 to 7.

As shown in FIG. 1, the scanner unit 101 includes a pickup unit 110 and a recording unit 120 each installed within a top portion of a housing 103. An original 10 on which an original image is recorded is wound around a detachable original drum 111 of the pickup unit 110, the original drum 111 being rotated in $\alpha$ direction at a constant speed by a motor 112 shown in FIG. 4. A pickup head 114 is displaced opposite the original drum 111. Driven by a motor 116 and screw rod 115 attached thereto, the pickup head 114 is translated in an X-direction while reading the original images 10. Hence, the $(-\alpha)$ direction is the main scanning direction and the X-direction is the subscanning direction.

The motors 112 and 116 are driven by a motor drive circuit 119. The rotation angles of the motors 112 and 116 are detected by rotary encoders 113 and 117, respectively, and given to a control unit 140 (FIG. 3) through an encoder output process circuit 118.

Image signals obtained in the pickup unit 110 are outputted to an image process unit 150 of FIG. 3. After subjected to an image processing which will be explained later, the image signals are converted into Y (Yellow), M (magenta), C (cyan) and K(black) halftone dot signals for an yellow block, a magenta block, a cyan block and a black block, respectively. The halftone dot signals are then given to a recording unit 120.

Figure 6:
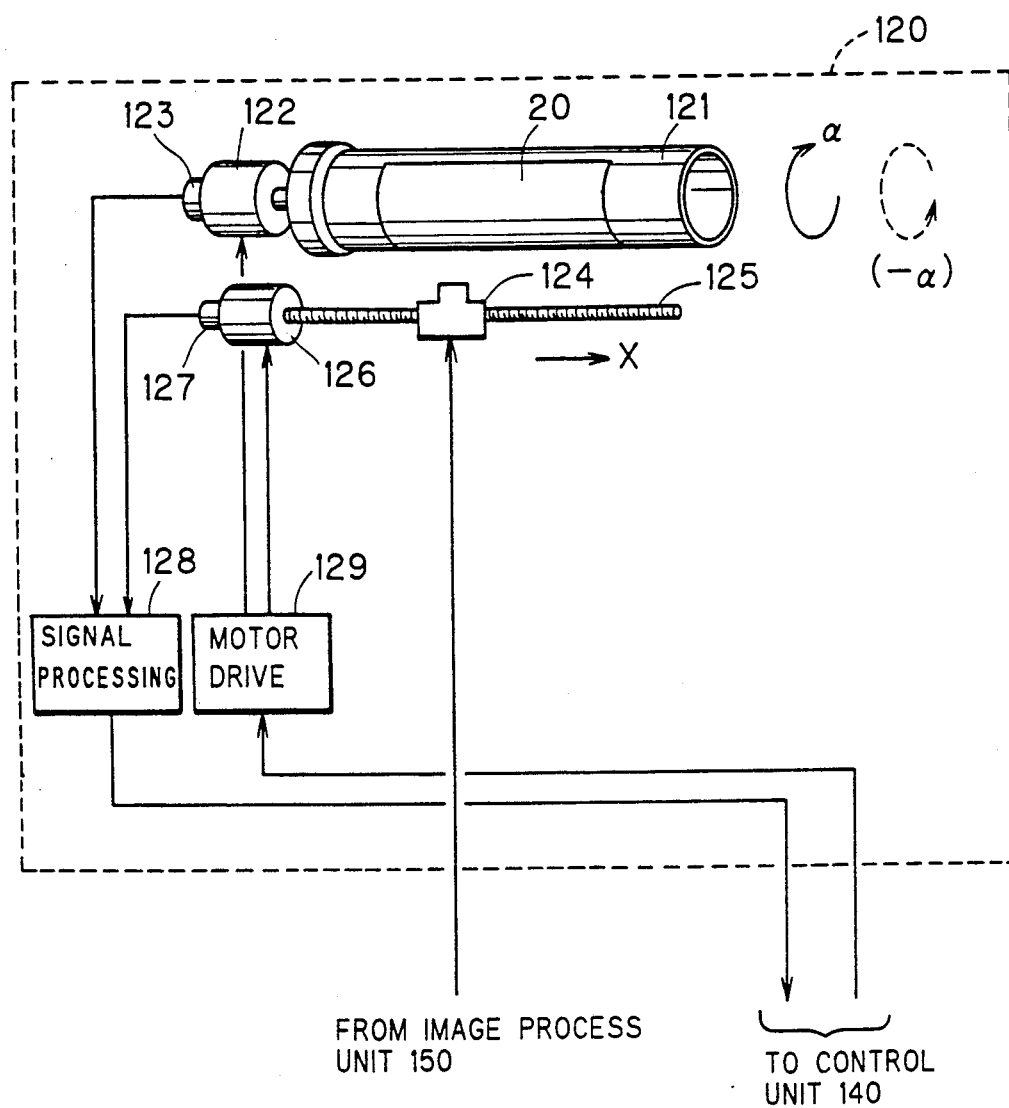
FIG. 6 is a diagram of the inner structure of a recording unit of the scanner unit.

The recording unit 120 includes a recording drum 121 around which a photosensitive film 20 is wound (FIGS. 1 and 6). Likewise the original drum 111, the recording drum 121 is rotated in $\alpha$ direction at a constant speed by a motor 122 shown in FIG. 6. A recording head 124 is displaced opposite the original drum 121. Driven by a motor 126 and a screw rod 125 attached thereto, the recording head 124 is translated in the X-direction while recording halftone do images for Y, M, C and K on the photosensitive film 20. Similarly to the image-reading process, the $(-\alpha)$ direction is the main scanning direction and the X-direction is the subscanning direction.

The motors 122 and 126 are driven by a motor drive circuit 129. The rotation angles of the motors 122 and 126 are detected by rotary encoders 123 and 127, respectively, and given to the control unit 140 (FIG. 3) through an encoder output process circuit 128.

Referring to FIG. 1 again, the housing 103 includes in the top portion thereof CRTs 131 and 133, a floppy disk drive (FDD) part 132 and a keyboard panel 134. A film box 104 is inserted to a lower middle portion of the housing 103. From the film box 104, an unexposed film is automatically mounted to be loaded onto the recording drum 121.

The automatic processor 102 is displaced behind the scanner unit 101. The photosensitive film 20 with latent images recorded thereon is automatically conveyed to the automatic processor 102, where the photosensitive film 20 is developed.

The electrical structure of the process color scanner 100 will be explained in detail later.

(A-2) Setup Device 200

Figure 8:
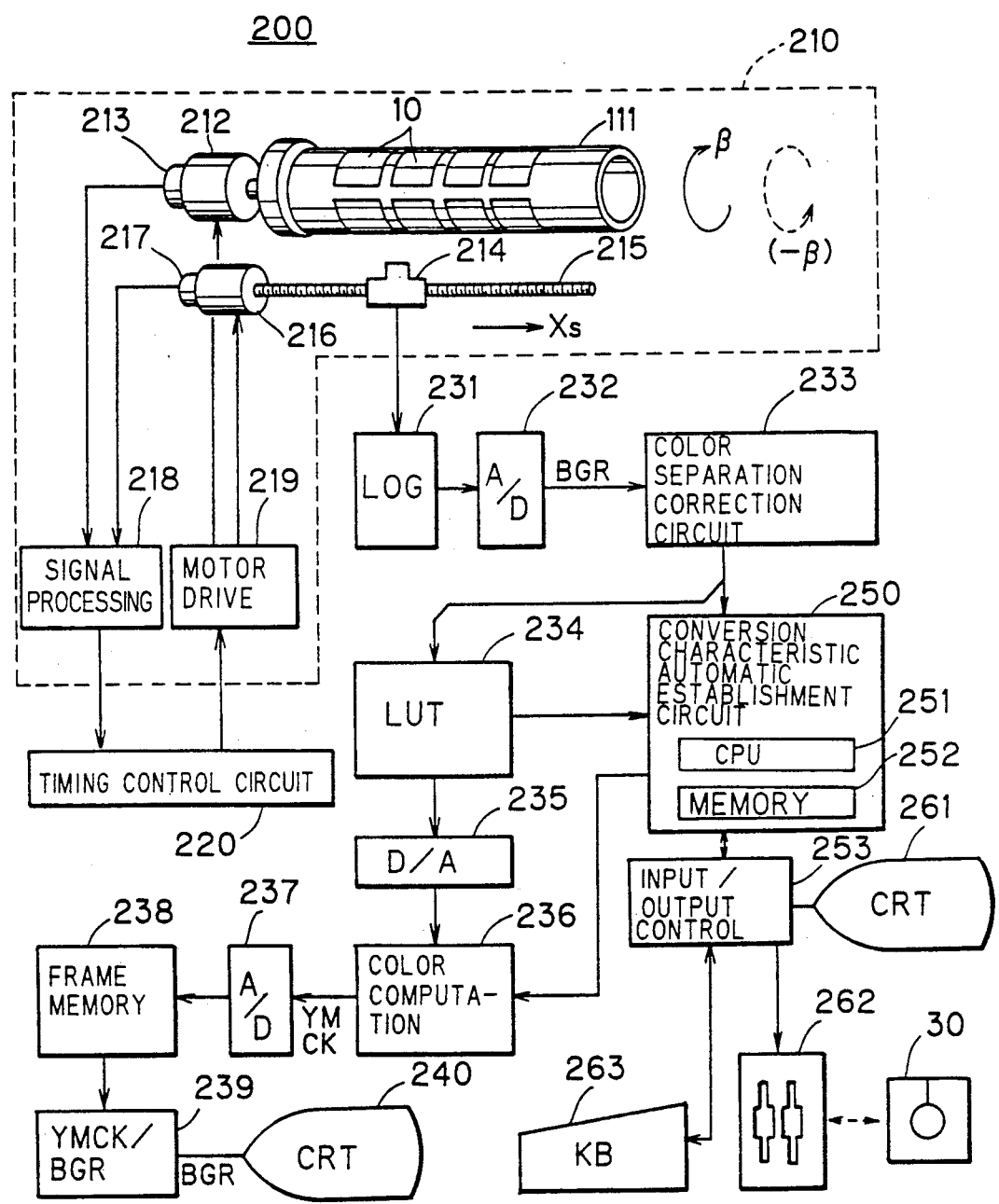
FIG. 8 is a block diagram of the structure of the setup device.

The setup device 200 will be described while referring both to FIG. 2 and FIG. 8 where the inner structure thereof is illustrated. The setup device 200 includes a pickup unit 210. The pickup unit 210 comprises a pickup head 214 which is translated in an $X_S$-direction by a motor 216 and a screw rod 215. The original drum 111 of FIGS. 2 and 8, displaced parallel to the screw rod 215, correspond to the original drum 111 of FIG. 1 illustrated as mounted within the process scanner 100. The original drum 111 is mounted to the setup device 200, first, to establish setup conditions. The original drum 111 is thereafter manually detached from the setup device 200 and mounted to the process scanner 100. The original drum is detachable also from the setup device 200.

In the setup device 200, the original drum driven by a motor 212 and rotates in a $\beta$-direction at a constant speed, whereby each pixel of an original 10 is read by the pickup head 214 through a pickup lens 214a. In the setup device 200, the $(-\beta)$-direction is the main scanning direction and the $X_S$-direction is the subscanning direction. The pickup head 214 is equipped with an indicator, which is a density indicator 271, for example.

An input/output unit of the setup device 200 comprises CRTs 240 and 261, a keyboard 263 and an FDD part 262. The CRT 240 is for monitoring an image which has been read by the pickup head 214 and color-computed. The CRT 261 displays a menu and the like.

The motors 212 and 216 are drived by a motor drive circuit 219. The rotation angles of the motors 212 and 216 are detected by rotary encoders 213 and 217, respectively, and given to a timing control circuit 220 through an encoder output process circuit 218. The timing control circuit 220 controls a motor drive circuit 219 in response to rotation angle signals from the encoder output process circuit 218. Under the control of the timing control circuit 220, the motor drive circuit 219 drives the motors 212 and 216.

The electrical structure of the setup device 200 will be explained in detail later.

B. Operations of Establishing Setup Conditions

Figure 9:
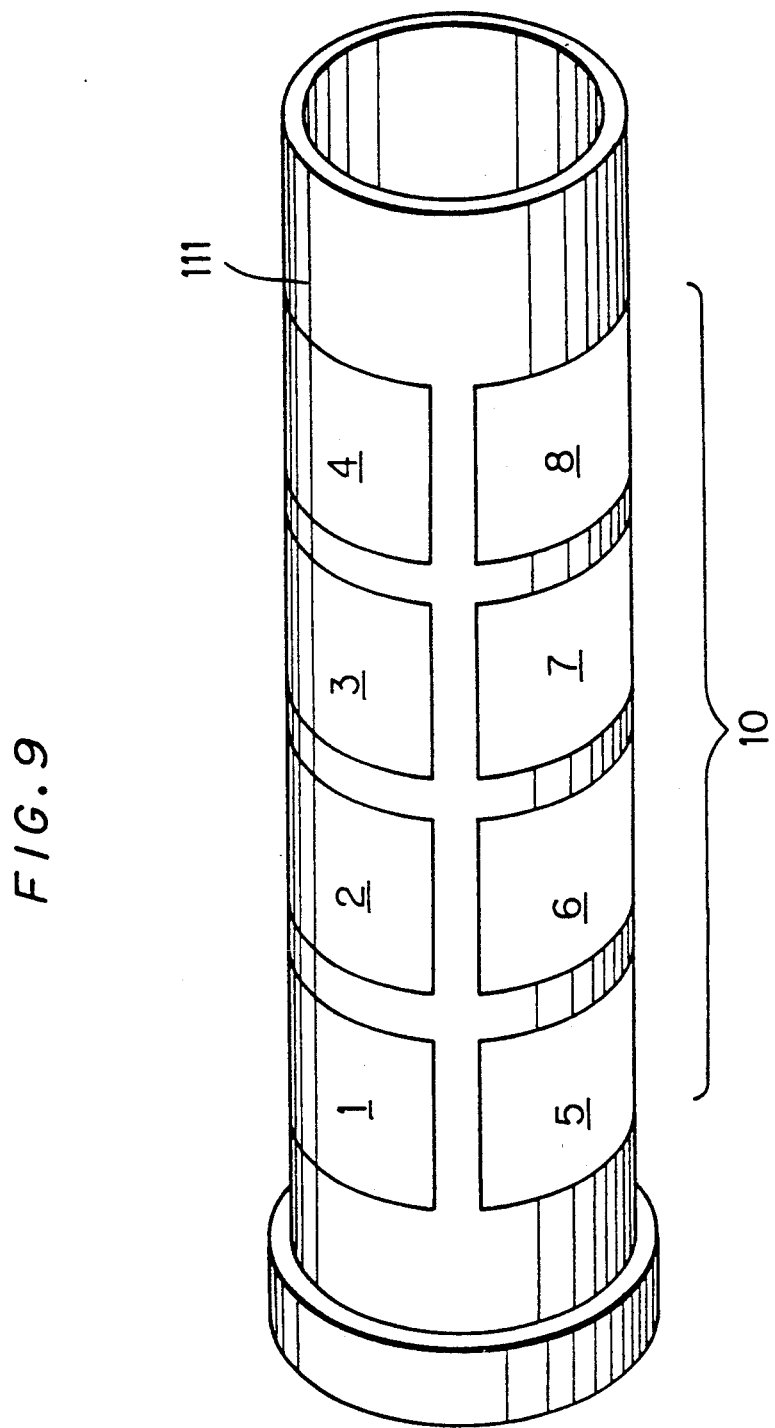
FIG. 9 is a perspective view of original images as mounted to an original drum.

FIG. 9 illustrates the original drum 111 on which a plurality of original images 1 to 8 to be reproduced are attached. The original images 1 to 8, which correspond to the original images 10 of FIGS. 1 and 2, are arranged at a random order on the drum 111.

The original drum 111 is mounted to the setup device 200 of FIG. 2. Before starting prescanning of the original images 1 to 8 by operating on the keyboard 263, an operator examines the original images 1 to 8, for example, by determining a region to be trimmed from each of the original images 1 to 8.

The image of the original 1 are read for each pixel, whereby image signals B, G and R for the color components blue, green and red are generated. The reading of the original 1 and signal processings such as skipping of pixels are simultaneously carried out. The image signals B, G and R are converted into signals representing logarithmic values of the signals B, G and R in a logarithmic amplifier 231, and further converted into digital signals by an A/D convertor 232. The signals are then given to a color separation correction circuit 233.

A photomultiplier of the pickup head 214 of the setup device 200 and that of the scanner unit 101 have different photoelectric characteristics. Likewise, electric characteristics are different between the logarithmic amplifier 231 of the setup device 200 and that of the scanner unit 101. The color separation correction circuit 233 compensates for such differences between the setup device 200 and the scanner unit 101. These difference are previously measured and signal values corresponding to the differences are stored in advance as offset values $S_{OX}$ (X=B, G and R) in the color separation correction circuit 233.

The offset values $S_{OX}$ are added to or extracted from the image signals for the respective color components inputted to the color separation correction circuit 233. The result of the addition or the extraction is then given to a conversion characteristic automatic establishment circuit 250 from the color separation correction circuit 233.

The conversion characteristic automatic establishment circuit 250 includes a CPU 251 and a memory 252. In generating an image reproduction characteristic conversion curve, the circuit 250 serves as so called artificial intelligence circuit (AI). As herein termed, the "image reproduction characteristic conversion curve" referes to a curve for converting density values of the respective color components of the original image into density values in accordance with which the original image is appropriately reproduced. Thus, the image reproduction characteristic conversion curve is identical to a normalization curve as it is called. That is, a density conversion curve defined in response to a highlight density and a shadow density of the original image is the "image reproduction characteristic conversion curve."

The conversion characteristic automatic establishment circuit 250 may have a structure similar to that disclosed in Japanese patent laying open gazette Nos. 63-42575 (1988) and 2-12244 (1990). More precisely, the conversion characteristic automatic establishment circuit 250 serves as an image analyzer and generates a color density histogram of the original (or cumulative density histogram) by statistically analyzing signals inputted thereto, to determine a highlight point and a shadow point by using the histogram. The conversion characteristic automatic establishment circuit 250 thereafter determines an image reproduction characteristic conversion curve in accordance with the highlight point and the shadow point. On the other hand, if a mathematical function is employed to generate image reproduction characteristic conversion curves, the image reproduction characteristic conversion curves are defined by determining parameter values included in the mathematical function. Such parameters will be hereinafter termed as "conversion parameters." In the preferred embodiment of the present invention. The image reproduction characteristic conversion curve is defined by determining the conversion parameters. The image reproduction characteristic conversion curve will be hereinafter refered to simply as "conversion curve."

Figure 10:
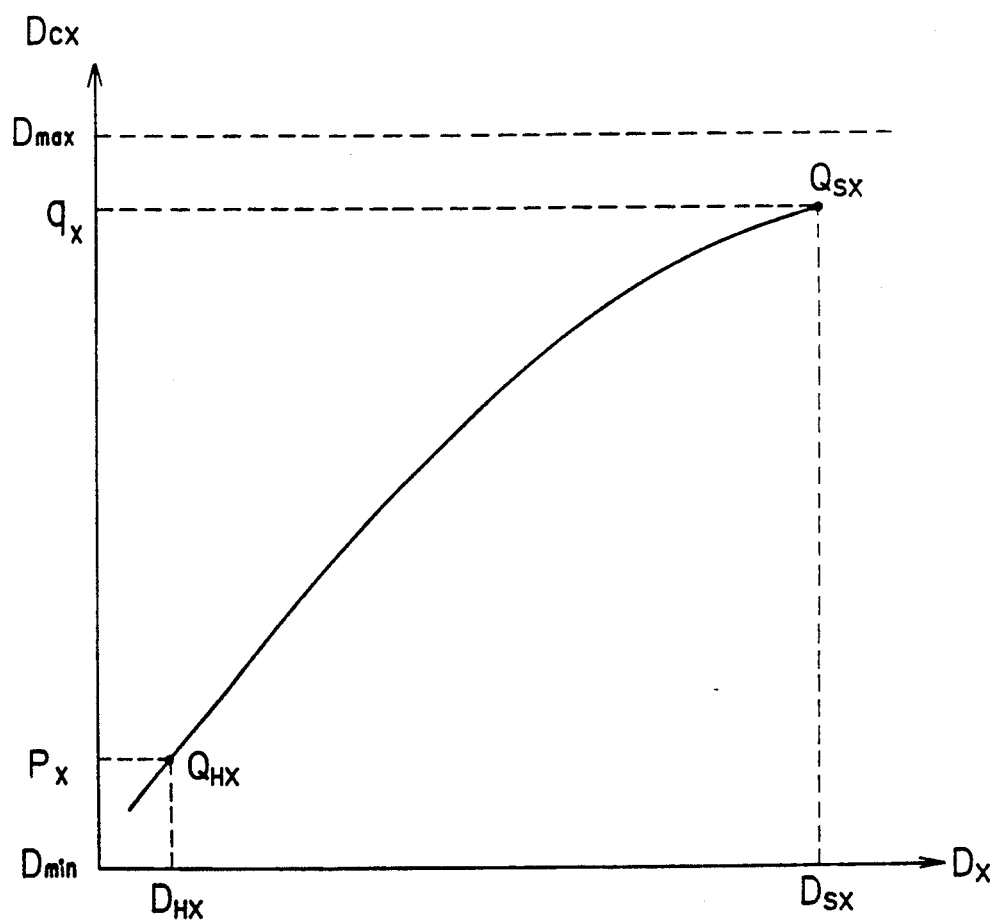
FIG. 10 is a graph showing an example of an image reproduction characteristic conversion curve.

In accordance with the values of the conversion parameters determined by the conversion characteristic automatic establishment circuit 250, the CPU 251 generates numerical tables which represent the conversion characters of the conversion curves for respective color components and loads the same in a lookup table memory (LUT) 234. FIG. 10 shows an example of the conversion curves for the respective color components loaded into the LUT 234. In accordance with the conversion curve of FIG. 10, the densities $D_X$ of the original image are converted into densities defined in the correction density range from $D_{min}$ to $D_{max}$, thereby optimum image reproduction characteristics are obtained. The points $Q_{HX}=(D_{HX}, p_X)$ and $Q_{SX}=(D_{SX}, q_X)$ are the highlight point and the shadow point for one color component, respectively.

Next, the original image 1 is read again. The image signals of the original image 1 are supplied to the LUT 234 where they are converted through the conversion tables. The converted image signals are thereafter reconverted into analog image signals by a D/A convertor 235. The analog image signals B, G and R for the respective color components are further converted into analog image signals Y, M, C and K in a color computation circuit 236 in which standard color computation characteristics are loaded in advance.

The analog image signals Y, M, C and K are converted into digital signals by an A/D convertor 237, to be thereafter stored in a frame memory 238. The digital signals are then supplied to a YMCK/BGR conversion circuit 239 where they are reconverted into analog signals B, G and R. Thus, a color image is displayed on the CRT 240 in accordance with the reconverted analog signals B, G and R. The highlight density and the shadow density of the original image are shown in meter values on another CRT 261.

Through visual observation on the CRT 240, an operator determines whether the color separation conditions are appropriate. If decides necessary, the operator changes the characteristics of the color separation conditions by operating on the keyboard 263. Operations on the keyboard 263 are informed to the CPU 251 through an input/output control circuit 253. The CPU 251 stores the contents of the operations in the memory 252. The image reproduction characteristic conversion curve can be amended as well if necessary.

The procedures above are repeated on each of the original images 1 to 8 in turn, the image reproduction characteristic conversion curves and the color computation characteristics of the original images 1 to 8 being thereby established. The operator determines other data necessary for recording halftone dot images of the respective original images 1 to 8, e.g., a reproduction magnification, a type of a halftone dot and a screen pitch by tapping on the keyboard 263 while referring to a menu displayed on the CRT 261. Information on an order in which the original images 1 to 8 are recorded during unmanned operation of the process color scanner 100 is also designated and inputted by the operator. This information will be hereinafter termed "recording order information of originals." The unmanned operation of the process color scanner 100 will be described in detail later. The description hereinafter is directed to where the original images 1 to 8 are recorded serially in that order.

Following this, a floppy disk 30 is inserted to an FDD part 262. By operating On the keyboard 263, information on the image reproduction characteristic conversion curves and the color computation characteristics of the original images 1 to 8 is written into the floppy disk 30 as setup condition data, the information being in the form of data expressed by the conversion parameters.

Together with the setup condition data, identification data (e.g., identification numbers) of the original images 1 to 8 is written into the floppy disk 30 to identify which setup condition data corresponds to which original image, the identification data being attached to and associated with the setup condition data. Information on trimming regions, the aforementioned data necessary for recording halftone dot images of the original images 1 to 8 as well as the recording order of the original images 1 to 8 is also written into the floppy disk 30. The data mentioned above except for the setup condition data will be hereinafter referred to as "attached data."

The setup condition data and the other data may be written into the floppy disk 30 every time the setup conditions for each one of the original images 1 to 8 are established or after the setup conditions for all of the original images 1 to 8 are established.

C. Operations of Image Recording

Figure 7:
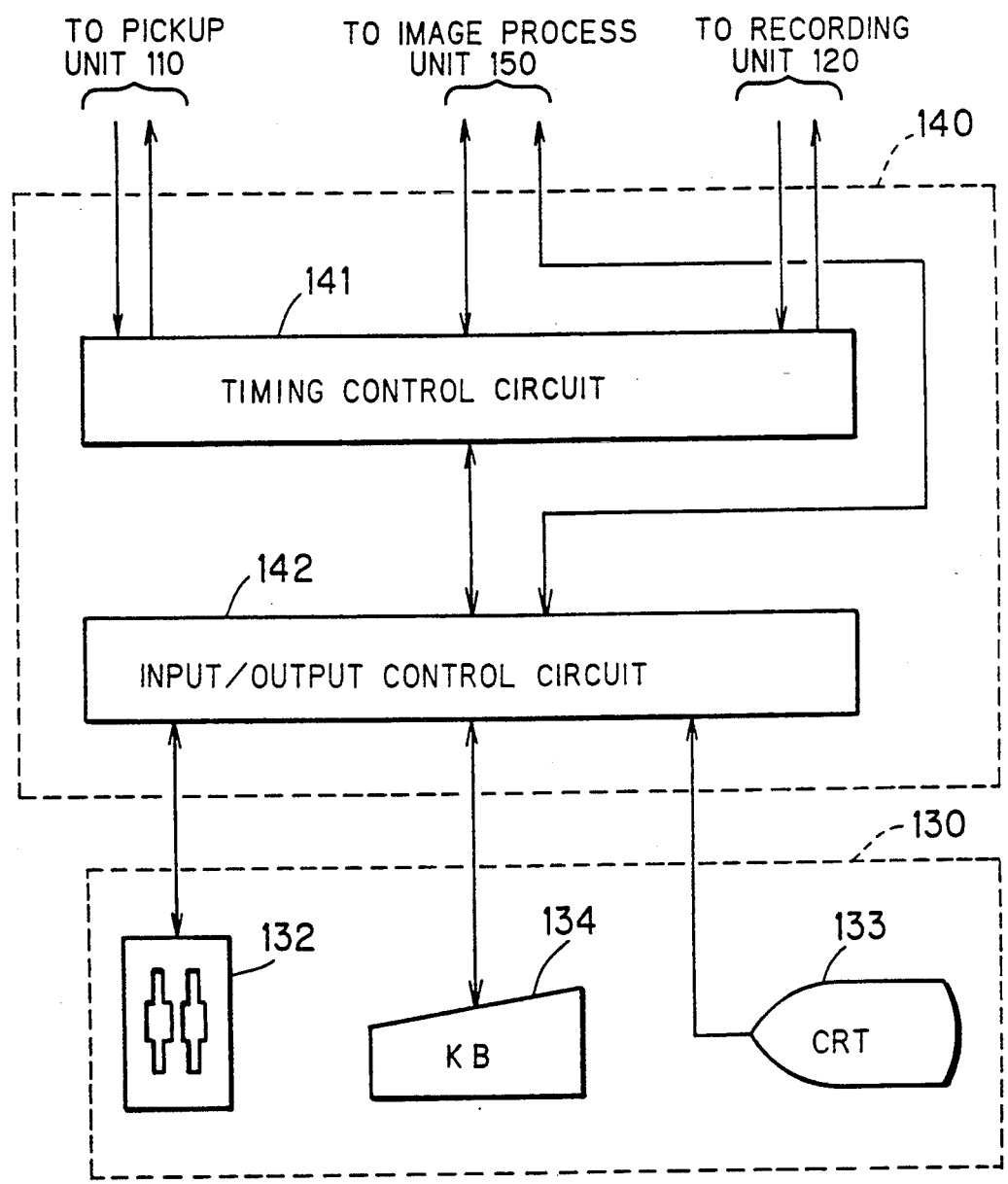
FIG. 7 is a block diagram of the inner structures of a control unit and an input/output unit of the scanner unit.

After the setup condition data and the attached data have been determined and written into the floppy disk 30, the original drum 111 with the original images 1 to 8 remaining wound therearound is detached from the setup device 200 and mounted to the pickup unit 110 of the scanner unit 101 (FIG. 1) by the operator. Likewise, the floppy disk 30 storing the setup condition data and the attached data is detached and inserted into the FDD part 132 manually by the operator. As shown in FIGS. 3 and 7, the FDD part 132 is a part of the input/output unit 130. In response to instructions inputted through a keyboard 134, the setup condition data and the attached data read at the FDD part 132 is transmitted to the image process unit 150 (FIG. 3) through an input/output control circuit 142 of the control unit 140.

Figure 5:
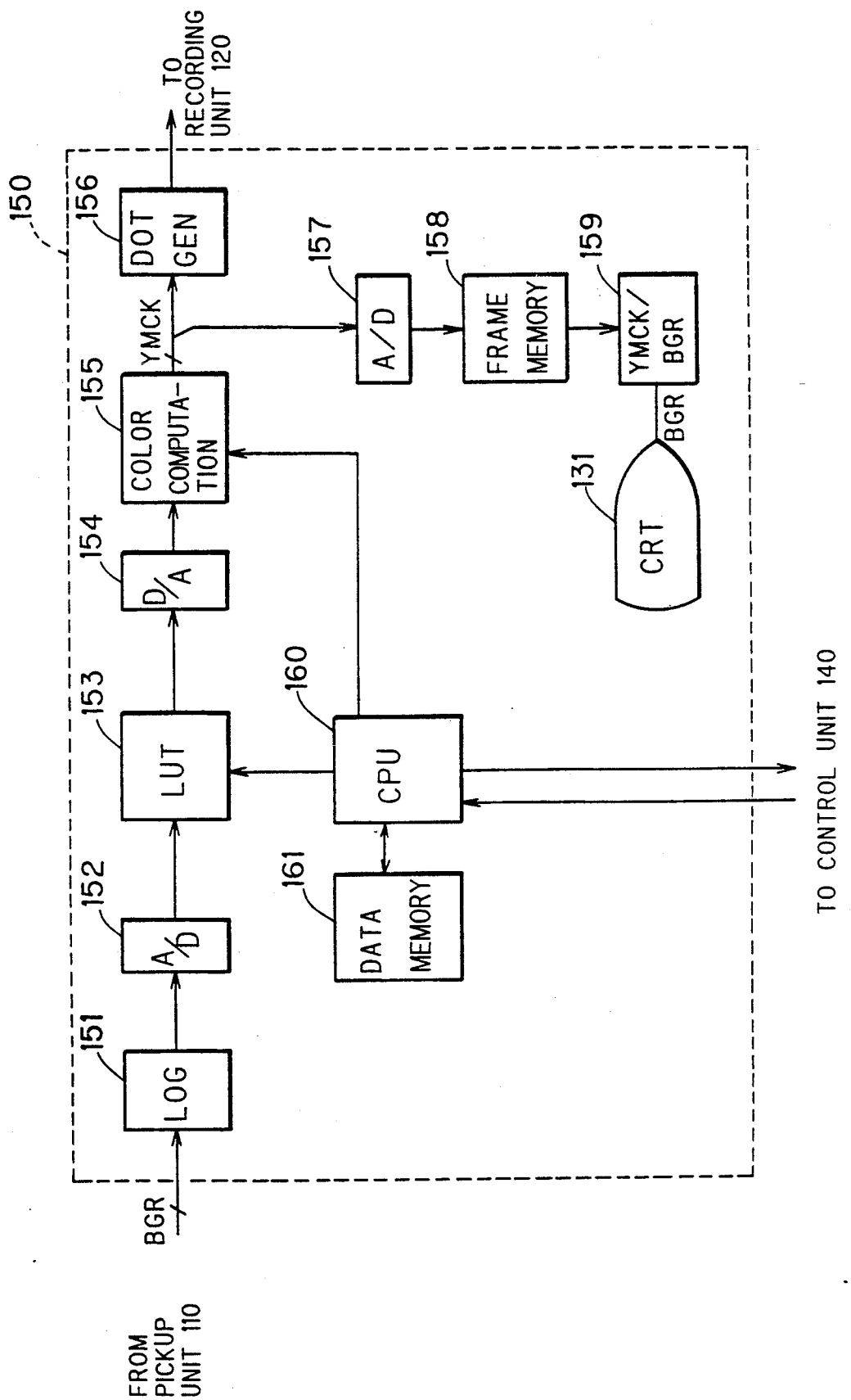
FIG. 5 is a block diagram of the inner structure of an image process unit of the scanner unit.

FIG. 5 shows the details of the image process unit 150. The setup condition data and the attached data is supplied to a CPU 160 of the image process unit 150. The CPU 160 specifies the original image 1 which is to be recorded first, in accordance with the recording order information of original included in the attached data. Next, in reference to the setup condition data for the original image 1, more particularly, to the conversion parameters included therein, the CPU 160 generates numerical tables which represent the image reproduction characteristic conversion curve for respective color components of the original image 1, the numerical tables being thereafter loaded into an LUT 153. The CPU 160 also specifies the color computation characteristics of the original image 1 in accordance with the setup condition data, and loads the color computation characteristics into a color computation circuit 155. The other data is given to a data memory 161.

Following this, the timing control circuit 141 (FIG. 7) gives a timing signal to the pickup unit 110, the image process unit 150 and the recording unit 120 in response to a control signal from the CPU 160, whereby reading and recording of the original image 1 are started. First, the image signals B, G and R of the respective color components are supplied from the pickup unit 110 to a logarithmic amplifier 151 where they are converted into signals representative of logarithmic values of the optical densities on the original image 1. The signals are further converted into digital signals by an A/D convertor 152 and given to the LUT 153.

The LUT 153 converts the inputted image signals through the image reproduction characteristic conversion curves loaded therein to generate converted image signals. The converted image signals are then converted into the analog image signals B, G, and R by a D/A convertor 154 and given to the color computation circuit 155. The analog image signals are still further converted into the analog image signals Y, M, C and K in the color computation circuit 155 in accordance with the color computation characteristics stored therein to be given to a halftone dot generation circuit 156. The halftone dot generation circuit 156 reads screen pattern data from a screen pattern memory stored therein, the screen pattern data being read for each pixel of the original. The image signals Y, M, C and K given to the halftone dot generation circuit 156 are compared with the screen pattern data. The results of the comparison are transmitted in the form of an ON/OFF signal to the recording head 124 (FIG. 6). Thus, halftone dot images of the original image 1 are recorded on the photosensitive film 20 by a laser beam from the recording head 124.

When the recording of the first original image 1 finishes, the CPU 160 generates the image reproduction characteristic conversion curves of the respective color components of the second original image 2 in accordance with the setup condition data for the second original image 2, the contents of the data stored in the LUT 153 being thereby changed. The color computation characteristics stored in the color computation circuit 155 are replaced with the color computation characteristics for the second original image 2. In addition, if the recorded photosensitive film 20 needs to be replaced with new film, the recorded photosensitive film 20 is automatically conveyed to the automatic processor 102 (FIG. 1) and unexposed new photosensitive film is automatically mounted to the recording drum 121 from the film box 104.

Thereafter, the pickup unit 110 is activated once again to start reading the original image 2. The image signals generated from the original image 2 are converted into converted image signals through the image reproduction characteristic conversion curves and the color computation characteristics for the original image 2. In accordance with thus generated converted image signals, halftone dot images of the original image 2 are recorded on the photosensitive film 20.

The original images 3 to 8 are recorded in turn in a similar manner. Thus, halftone dot images for Y, M, C and K color blocks of the original images 1 to 8 are automatically recorded on one or more photosensitive films 20. The sequence of the automatic recording is under control of the timing control circuit 141 which is activated by the CPU 160 in accordance with the recording order information of original.

Color separation may be visually examined before image recording. More particularly, the output signals of the color computation circuit 155 are converted into digital signals by an A/D convertor 157 and further supplied to a frame memory 158 and a YMCK/BGR conversion circuit 159 to be converted into BGR signals. The BGR signals are then supplied to a CRT 131 so that a color-separated image is displayed on the CRT 131 in the form of visual color image. Thus, the color separation is visually examined. Examining the color separation, the operator may change the setup conditions if such necessity exists. However, such monitoring device may be omitted because the process scanner 100 can perform unmanned operation. Although the CRT 131 is illustrated as mounted within the image process unit 150, this is merely for clarity of illustration. The actual structure of the scanner 100 requires that the CRT 131 is installed within the input/output unit 130 (FIG. 7).

Thus, in the process scanning system according to the preferred embodiment, color separation and halftone dot image recording of the original images 1 to 8 are continuously executed after the setup conditions for the original images 1 to 8 are automatically or semi-automatically established by the setup device 200 (FIG. 11). Since the setup conditions for the original images 1 to 8 are determined by using the setup device 200, the scanner 100 is not occupied to establish the setup conditions. As a result, the operation efficiency of the scanner 100 is enhanced.

Another advantage is that an experienced operator is not needed since the setup device 200 automatically or semi-automatically determines the factors necessary for establishing setup conditions such as the image reproduction characteristic conversion curves. More advantageously, when a plurality of original images need to be mounted on one original drum and reproduced after the setup conditions for the original images are established, unmanned operation of the process scanner 100 for long tome is attained. In addition, setup of the scanner unit 101 is properly done because differences in image reading characteristics between the setup device 200 and the scanner unit 101 are compensated.

D. Modifications (1) As described earlier, color separation correction is performed to compensate for differences between the setup device 200 and the scanner unit 101 in terms of the factors necessary for establishing setup conditions such as image reading characteristics. Although the foregoing has described that the color separation correction is performed in the color separation correction circuit 233, similar color separation correction is obtainable in the conversion characteristic automatic establishment circuit 250 without providing the color separation correction circuit 233. In this modification, the conversion characteristic automatic establishment circuit 250 determines first and second image reproduction characteristic conversion curves $F_{1X}$ and $F_{2X}$ (X=B, G and R), which curves are not shown in the drawings. The former curves $F_{1X}$ are adapted to convert signal values $(B \pm S_{OB})$, $(G \pm S_{OG})$ and $(R \pm S_{OR})$ obtained by adding offset values $S_{OX}$ (X=B, G and R) to or extracting the offset values $S_{OX}$ from the input image signals B, G and R into values $S_B$, SG and $S_R$ (not shown). The latter curves $F_{2X}$ are such that the values of the image signals B, G and R not subjected to addition or extraction of the offset values $S_{OX}$ are converted into values $S_B$, $S_G$ and $S_R$ equivalent to those obtainable through the first image reproduction characteristic conversion curves $F_{1X}$. The second image reproduction characteristic conversion curve $F_{2X}$ is loaded into the LUT 234. The first image reproduction characteristic conversion curve $F_{1X}$ is loaded into the scanner 100.

Such color separation correction as above is unnecessary if the setup device 200 and the scanner unit 101 have the same image reading characteristics.

(2) The setup condition data does not always have to be expressed by parameters. Instead, the numerical table of conversion curves may be loaded into the scanner 100.

Data transmission between the scanner 100 and the setup device 200 may be done through a portable storage medium such as a magnetic disk, a magnetic drum or an IC card or may be done on-line.

(3) The process scanner system according to the present invention is applicable not only to where a plurality of original images are mounted to the original drum 111 but also to where only one original image is mounted to the original drum 111. In addition, although the foregoing is related to a color scanner, setup of a gradation curve required in a monochrome scanner is within the application field of the present invention. Application to a flat-bed type scanner is possible, too.

In general, when first to N-th originals (N=an integer larger than one) are prepared, a number M is selected within the range of $1 \leq M \leq N$ and the M-th original is subjected to the process of obtaining setup condition data. The number M is serially updated within the range of $1 \leq M \leq N$, so that first to N-th setup condition data are obtained. The first to N-th originals are transported to the setup device without being detached from the original drum and are mounted on the pickup unit in the scanner. A number L is selected within the range of $1 \leq L \leq N$ and the image of the L-th original is read and is converted in the scanner according to the corresponding setup condition. The number L is updated within the range of $1 \leq L \leq N$, so that first to N-th original images are reproduced on the photosensitive material.

If $N \leq 1$, on the other hand, the process step of selecting the number M and L are not required.

While the invention has been shown and described in detail, the foregoing description is in all aspects illustrative and not restrictive. It is understood that numerous modifications and variations can be devised without departing from the scope of the invention.

We claim:

1. A method of recording an image on an image recording medium, said method comprising the steps of:
   (a) obtaining a setup device and an image scanner which are spatially separated from each other, wherein
   said setup device comprises a first image reader and an image analyzing means; and
   said image scanner comprises a second image reader, an image signal converter and an image recorder;
   (b) preparing an original;
   (c) mounting said original on said first image reader of said setup device;
   (d) reading an image of said original by said first image reader of said setup device to obtain a first image signal;
   (e) statistically analyzing said first image signal by said image analyzing means to determine a setup condition under which said image of said original is to be recorded in said image scanner;
   (f) generating setup condition data representative of said setup condition;
   (g) delivering said setup condition data to said image scanner to establish said setup condition in said image signal converter;
   (h) detaching said original from said first image reader of said setup device and then mounting said original on said second image reader in said image scanner;
   (i) reading said image of said original by said second image reader in said image scanner to obtain a second image signal representative of said image of said original
   (j) converting said second image signal through said image signal converter holding said setup condition to obtain a converted second image signal; and
   (k) recording an image on an image recording medium by said image recorder in accordance with said converted second image signal.

2. The method of claim 1, wherein
the step (e) comprises the steps of:
   (e-1) correcting said first image signal using a value representative of difference between respective image-reading characteristics of said first and second image readers to obtain a corrected first image signal; and
   (e-2) statistically analyzing said corrected first image signal by said image analyzing means to determine said setup condition.

3. The method of claim 2, wherein
the step (e) further comprises the steps of:
   (e-3) setting said setup condition in an image signal conversion means provided in said setup device;
   (e-4) reading said image of said original by said first image reader to obtain a third image signal representative of said image of said original; and
   (e-5) converting said third image signal into a fourth image signal by said image signal conversion means;
   (e-6) displaying an image on display means in accordance with said fourth image signal.

4. The method of claim 3, wherein
the step (e) further comprises the step of:
   (e-7) correcting said setup condition while observing said image on said display means.

5. The method of claim 4, wherein
the step (g) comprises the steps of:
   (g-1) setting data storage means in said setup device;
   (g-2) storing said setup condition data in said data storage means; and
   (g-3) detaching said data storage means from said setup device and then setting said data storage means in said image scanner.

6. A method of recording an image on an image recording medium, said method comprising the steps of:
   (a) obtaining a setup device and an image scanner which are spatially separated from each other, wherein
   said setup device comprises a first image reader and an image analyzing means; and
   said image scanner comprises a second image reader, an image signal converter and an image recorder;
   (b) preparing first to N-th originals, where N is an integer larger than one;
   (c) mounting said first to N-th originals on an original holding means;
   (d) attaching said original holding means to said first image reader of said setup device;
   (e) selecting a number M in a range of $1 \leq M \leq N$ to designate an M-th original within said first to N-th originals;
   (f) reading an image of said M-th original by said first image reader of said setup device to obtain a first image signal for said M-th original;
   (g) statistically analyzing said first image signal for said M-th original by said image analyzing means to determine an M-th setup condition under which said image of said M-th original is to be recorded in said image scanner;
   (h) generating setup condition data representative of said M-th setup condition;
   (i) repeating the steps (e) to (h) while updating said number M in said range of $1 \leq M \leq N$ to obtain first to N-th setup condition data representative of first to N-th setup conditions, respectively:

(j) detaching said original holding means from said setup device and then mounting said original holding means on said second image reader in said image scanner without separating said first to N-th originals from said original holding means;

(k) delivering said first to N-th setup condition data to said image scanner;

(l) selecting a number L in a range of $1 \leq L \leq N$ to designate an L-th original within said first to N-th originals;

(m) establishing an L-th setup condition in said image signal converter according to an L-th setup condition data;

(n) reading an image of said L-th original by said second image reader in said image scanner to obtain a second image signal representative of said image of said L-th original;

(o) converting said second image signal through said image signal converter holding said L-th setup condition to obtain a converted second image signal for said L-th original:

(p) recording an L-th image on an image recording medium by said image recorder in accordance with said converted second image signal for said L-th original: and (q) repeating the steps (l) to (p) while updating said number L in said range $1 \leq L \leq N$ to obtain first to N-th images on said image recording medium.

7. The method of claim 6, wherein the step (g) comprises the steps of:

(g-1) correcting said first image signal for said M-th original using a value representative of difference between respective image-reading characteristics of said first and second image readers to obtain a corrected first image signal for said M-th original; and (g-2) statistically analyzing said corrected first image signal for said M-th original by said image analyzing means to determine said M-th setup condition.

8. The method of claim 7, wherein the step (g) further comprises the steps of:

(g-3) setting said M-th setup condition in an image signal conversion means provided in said setup device;

(g-4) reading said image of said M-th original by said first image reader to obtain a third image signal representative of said image of said M-th original; and (g-5) converting said third image signal for said M-th original into a fourth image signal for said M-th original by said image signal conversion means;

(g-6) displaying an image on display means in accordance with said fourth image signal for said M-th original.

9. The method of claim 8, wherein the step (g) further comprises the step of:

(g-7) correcting said M-th setup condition while observing said image on said display means.

10. The method of claim 9, wherein the step (k) comprises the steps of:

(k-1) setting data storage means in said setup device;

(k-2) storing said first to N-th setup condition data in said data storage means; and (k-3) detaching said data storage means from said setup device and then setting said data storage means in said image scanner to deliver said first to N-th setup condition to said image signal converter of said image scanner.

11. The method of claim 10, wherein the step (m) comprises the steps of:

(m-1) reading said L-th setup condition data from said data storage means; and (m-2) establishing said L-th setup condition in said image signal converter according to said L-th setup condition data read from said data storage means.

12. The method of claim 11, further comprising the step of:

(r) designating an order of recording respective images of said first to N-th originals and generating order-designation data representative of said order of recording said respective images;

wherein:

the step (k-2) comprises the step of:

(k-2-1) storing said order-designation data in said data storage means together with said first to N-th setup condition data;

the step (k-3) comprises the step of:

(k-3-1) transporting said data storage means holding said first to N-th setup condition data and said order-designation data from said setup device to said image scanner; and the step (l) comprises the step of:

(l-1) designating said L-th original according to said order-designation data.

13. The method of claim 12, wherein:

the step (k-2) further comprises the step of:

(k-2-2) storing discriminating data discriminating said first to N-th originals from each other in said data storage means; and the step (l) further comprises the step of:

(l-2) identifying said L-th original with reference to said discriminating data.

14. A process scanner system comprising;

(a) a setup device; and (b) a process scanner provided at a position spatially separated from said setup device;

wherein said setup device comprises:

(a-1) a first image reader operable to read respective image of at least one original to generate a first image signal;

(a-2) setup condition data generating means for statistically analyzing said first image signal to determine a setup condition for said respective image of said at least one original which is to be established in said process scanner and for generating setup condition data representative of said setup condition; and (a-3) output means for output said setup condition data for said at least one original; and said process scanner comprises:

(b-1) a second image reader for accepting said at least one original which is transported from said setup device and for reading said respective image of said at least one original to generate a second image signal for respective image of said at least one original;

(b-2) input means for inputting said setup condition data which is output from said output means of said setup device;

(b-3) image signal converter means in which said setup condition is established in accordance with said setup condition data input through said input means and for converting said second image signal to obtain a converted image signal for said at least one original according to said setup condition;

(b-4) means for obtaining a halftone dot image signal from said converted image signal for said at least one original; and (b-5) recording means for recording a halftone dot image on a photosensitive material for said at least one original in response to said halftone dot image signal.

15. The process scanner system of claim 14, wherein said setup device further comprises:

(a-4) means for correcting said first image signal using a value representative of difference between respective image-reading characteristics of said first and second image readers to obtain a corrected first image data; and (a-5) image analyzer means for statistically analyzing said corrected first image data by to determine said setup condition.

16. The process scanner system of claim 15, wherein said setup device further comprises:

(a-6) image signal conversion means for holding said setup condition therein and operable to convert a third image signal into a fourth image signal through a conversion character corresponding to said setup condition;

wherein said third image signal is obtained by reading said respective image of said at least one original by said first image reader; and (a-7) display means for displaying an image in accordance with said fourth image signal.

17. The process scanner system of claim 16, wherein said setup device further comprises:

(a-8) manual operation means for inputting correction data to correct said setup condition.

18. The process scanner system of claim 17, wherein said output means comprises:

(a-3-1) means for writing said setup condition data on a portable data storage medium, said input means comprises:

(b-2-1) means for accepting said portable data storage means which is transported from said setup device to read said setup condition data from said portable data storage means.

19. The process scanner system of claim 18, wherein said at least one original includes a plurality of originals;

said setup device further comprises:

(a-9) means for generating order-designation data representative of an order of recording respective images of said plurality of originals which is designated from exterior of said setup device, said order-designation data being stored in said portable data storage medium; and said process scanner further comprises:

(b-6) means for determining an order of reading respective images of said plurality of originals according to said order-designation data.

20. The process scanner system of claim 19, wherein said setup device further comprises:

(a-10) means for generating discrimination data discriminating said plurality of originals from each other, said generating discrimination data being stored in said portable data storage medium; and said process scanner further comprises:

(b-7) means for identifying each of said plurality of originals with reference to said discrimination data.

21. A process scanner comprising;

(a) a image reader for reading respective image of at least one original to generate an image signal for respective image of said at least one original;

(b) input means for inputting setup condition data through a portable data storage medium, wherein said setup condition data represents setup condition of said process scanner which is previously determined by statistically analyzing said respective image of said at least one original;

(c) image signal converter means in which said setup condition is established in accordance with said setup condition data input through said input means and for converting said image signal to obtain a converted image signal for said at least one original;

(d) means for obtaining a halftone dot image signal from said converted image signal for said at least one original; and (e) recording means for recording a halftone dot image on a photosensitive material for said at least one original.

22. The process scanner of claim 21, wherein said at least one original includes a plurality of originals;

order-designation data representative of an order of recording respective images of said plurality of originals is previously generated and stored in said portable data storage medium; and said process scanner further comprises:

(f) means for determining an order of reading said respective image of said at least one original according to said order-designation data.

23. The process scanner of claim 22, wherein discrimination data discriminating said plurality of originals from each other is previously generated and store in said portable data storage medium; and said process scanner further comprises:

(g) means for identifying respective one of said at plurality of originals with reference to said discrimination data.

24. A setup device for generating setup condition data which is to be established in an image signal converter provided in a process scanner, comprising:

(a) an image reader for reading respective image of at least one original to generate an image signal:

(b) setup condition data generating means for statistically analyzing said image signal to determine setup condition for said respective image of said at least one original which is to be established in said process scanner and for generating setup condition data representative of said setup condition; and (c) output means for output said setup condition data for said at least one original to a portable data storage medium.

25. The setup device of claim 24, wherein:

said image reader is a first image reader;

said process scanner comprises a second image reader; and said setup device further comprises:

(d) means for correcting said image signal using a value representative of difference between respective image-reading characteristics of said first and second image readers to obtain a corrected image data; and (e) image analyzer means for statistically analyzing said corrected image data to determine said setup condition.

26. The setup device of claim 25, further comprising:

(f) image signal conversion means for holding said setup condition therein and operable to convert a third image signal into a fourth image signal through a conversion character corresponding to said setup condition, wherein said third image signal is obtained by reading said image of said original by said first image reader; and (g) display means for displaying an image in accordance with said fourth image signal.

27. The setup device of claim 26, further comprising:

(h) manual operation means for inputting correction data to correct said setup condition.

28. The setup device of claim 27, wherein said at least one original includes a plurality of originals;

said setup device further comprising:

(i) means for generating order-designation data representative of an order of recording respective images of said plurality of images in said process scanner, wherein said order of recording said respective images is designated from exterior of said setup device; and (j) means for writing said order-designation data on said portable data storage medium together with said setup condition data.

29. The setup device of claim 28, further comprising:

(k) means for generating discrimination data discriminating said plurality of originals from each other; and (l) means for writing said discrimination data on said portable data storage medium together with said setup condition data.

* * * * *